United States Patent
St. Pierre

(10) Patent No.: US 8,960,794 B2
(45) Date of Patent: Feb. 24, 2015

(54) CHILD CARRIER AND CAR SEAT COMBINATION

(71) Applicant: John David St. Pierre, Worthington, OH (US)

(72) Inventor: John David St. Pierre, Worthington, OH (US)

(*) Notice: Subject to any disclaimer, the term of this patent is extended or adjusted under 35 U.S.C. 154(b) by 77 days.

(21) Appl. No.: 13/855,138

(22) Filed: Apr. 2, 2013

(65) Prior Publication Data
US 2014/0292049 A1 Oct. 2, 2014

(51) Int. Cl.
*A47D 1/10* (2006.01)
*A47D 13/02* (2006.01)
*B60N 2/32* (2006.01)
*B60N 2/26* (2006.01)

(52) U.S. Cl.
CPC *A47D 13/02* (2013.01); *B60N 2/32* (2013.01); *B60N 2/26* (2013.01)
USPC .................................. 297/256.16; 297/219.12

(58) Field of Classification Search
USPC ............... 297/256.16, 219.12, 183.1, 183.6; 224/158, 160, 161, 252
See application file for complete search history.

(56) References Cited

U.S. PATENT DOCUMENTS

| | | | | |
|---|---|---|---|---|
| 4,510,634 A * | 4/1985 | Diedrich et al. | ......... | 297/256.15 |
| 4,915,446 A * | 4/1990 | Darling et al. | ........... | 297/256.16 |
| 5,267,680 A * | 12/1993 | Torok | ............... | 224/158 |
| 5,540,365 A * | 7/1996 | LaMair | ............... | 224/158 |
| 5,660,430 A * | 8/1997 | Clarke | ............... | 297/256.16 |
| D407,213 S * | 3/1999 | McConnell | ................... | D3/213 |
| 6,070,890 A * | 6/2000 | Haut et al. | ............... | 297/256.16 |
| 6,341,818 B1 * | 1/2002 | Verbovszky et al. | ..... | 297/219.12 |
| 6,367,875 B1 * | 4/2002 | Bapst | ......................... | 297/183.1 |
| 6,926,181 B1 * | 8/2005 | Vath | .................... | 224/159 |
| 7,222,917 B2 * | 5/2007 | Ward | ..................... | 297/219.12 |
| D551,443 S * | 9/2007 | Wilmink | ....................... | D3/214 |
| 7,270,372 B2 * | 9/2007 | Robertson | ................. | 297/183.6 |
| 7,597,396 B2 * | 10/2009 | Longenecker et al. | .. | 297/256.16 |
| 7,810,682 B2 * | 10/2010 | Balensiefer et al. | ......... | 224/158 |
| 7,914,075 B2 * | 3/2011 | Danziger | ................ | 297/219.12 |
| 7,950,738 B2 * | 5/2011 | Shafer et al. | ............. | 297/256.16 |
| 8,240,772 B2 * | 8/2012 | Kawata et al. | .......... | 297/219.12 |
| 8,567,862 B2 * | 10/2013 | Williams et al. | ......... | 297/256.16 |
| 2005/0110315 A1 * | 5/2005 | Littlehorn et al. | ....... | 297/219.12 |
| 2008/0067845 A1 * | 3/2008 | Ohren et al. | ............ | 297/256.16 |
| 2011/0074194 A1 * | 3/2011 | Weber et al. | ............. | 297/256.16 |

* cited by examiner

*Primary Examiner* — Jose V Chen

(57) ABSTRACT

A rigid wearable child carrier with shoulder strap, restraint system with integrated handle, and kickstands to be used with a corresponding car seat wherein the child carrier operates both independently and in conjunction with the car seat and the car seat operates independently and also operates normally when the carrier is present.

20 Claims, 3 Drawing Sheets

CHILD CARRIER AND CAR SEAT COMBINATION

CROSS-REFERENCE TO RELATED APPLICATIONS

Not Applicable

FEDERALLY SPONSORED RESEARCH

Not Applicable

SCIENCE LISTING OR PROGRAM

Not Applicable

BACKGROUND OF THE INVENTION

1. Field of Invention

This invention relates to apparatus for securing and carrying children, in particular it relates to shoulder supported apparatus to transport children in a system that works with a corresponding car seat.

2. Background of the Invention

There are child carriers available, but they each have significant disadvantages. The flexible and soft shoulder "sling" suspended carriers are designed to carry the baby or infant through a strap or series of straps that secure the child closely to the front or back torso of the wearer. The strapping systems for this type of carrier make mounting and un-mounting the carrier very cumbersome, and doing so will generally jostle a sleeping child. Sling carriers do not allow for the child to be set down easily in a balanced and supported position to relieve the wearer. These close fitting carriers also may be uncomfortable for the wearer on hot or cold weather days. Suspended sling carriers provide extremely limited range of motion for the infant. U.S. Pat. No. 6,409,060 (Bichelor) discloses this sling-type carrier.

Shoulder suspended "Backpack" style hard frame carriers carry the infant on the back of the wearer. U.S. Pat. No. 3,799,414 (Fiffer) is an example of this type of carrier. The infant's legs are passed through holes in a sling and the infant's back is supported with fabric. The frame keeps the fabric supported in place and the infant is secured in a sitting position. Younger infants, who are not sitting up on their own are not compatible with this arrangement. The infant is generally loaded into the carrier prior to mounting the carrier on the wearer, however, the mounting of a loaded carrier is cumbersome and requires a level of experience and skill to be accomplished safely. Many users may find it necessary to have another adult aid in mounting a loaded carrier.

While mounted, the wearer may have extremely limited physical and visual access to the infant and is therefore unable to attend to its needs easily. Older or less robust wearers may be intimidated by the physical requirements necessary for using this type of carrier.

There are a number of car safety seats with provisions for portions that are removable to transport an infant. U.S. Pat. No. 6,454,350 Celestina-Krevh is an example. These include removable portions that are designed to be an integral and essential portion of the restraint of the infant during a car crash. The designs require an intrinsically rigid seat shell that houses all the restraint straps and structural elements to transfer the car's adult seatbelt system function to that of the child seat and the child seat removable (carrying) portion. The removable portion, in each current example, has significant mechanical systems and material weight for attaching to the car seat belt or the car seat. Often the handles of this "Car Seat" type carrier are designed to be outside of the range of motion of the child during a crash situation, resulting in an extremely detrimental effect on the design of the removable portion for extended use carrying. U.S. Pat. No. 7,810,682 Balensiefer discloses a design that has a portion of the safety restraint system that is removable along with a sling type carrier. The carrier portion contains undesirable weighted structure and crash rated strapping and buckles for the essential disengagement and reengagement to the car seat portion. The car seat portion is not operable without the carrier system in place.

3. Object and Advantages

Accordingly, besides the objects and advantages of the child carrier and car seat combination in my above patent, several objects and advantages of the present invention are:

(a) to provide an extremely lightweight, wearable child carrier that allows the infant to be in an un-jostled, natural, comfortable, reclined position while the wearer is wearing the loaded carrier, while the loaded carrier is set down, and while the carrier is returned to the car seat portion of the combination.

(b) to provide a wearable child carrier that is configured for safe, practical, and comfortable extended use over a variety of terrain.

(c) to provide a carrier that is low profile with kickstands that fold in and functions in conjunction with, and also entirely independently from the car seat portion.

(d) to provide a wearable child carrier that allows the wearer to shift conveniently from a shoulder mounted position, to a hand carried position, or to a floor rested position and back with little effort. Also, the carrier is intuitive in its manner of operation and is compatible with the requirements of older and weaker wearers.

(e) to provide an extended use, all terrain child carrier with access from the wearer to the child while in use.

(f) to provide a carrier with a single handle that is centrally located just over the infants torso and uses the carrier restraint straps to provide a highly maneuverable carrier when such carrier is carried by the handle.

SUMMARY

The device as herein disclosed and described provides a new and unique utility for carrying children and supporting children in a reclined position at rest. The device meets the need for an all-terrain carrier that is convenient for the wearer to load and unload and is lightweight and intended for both short and extended hiking and can be used in conjunction with a mating car seat without affecting the function of the car seat.

DRAWING—FIGURES

In the drawings, closely related figures have the same number.

Figure 1:
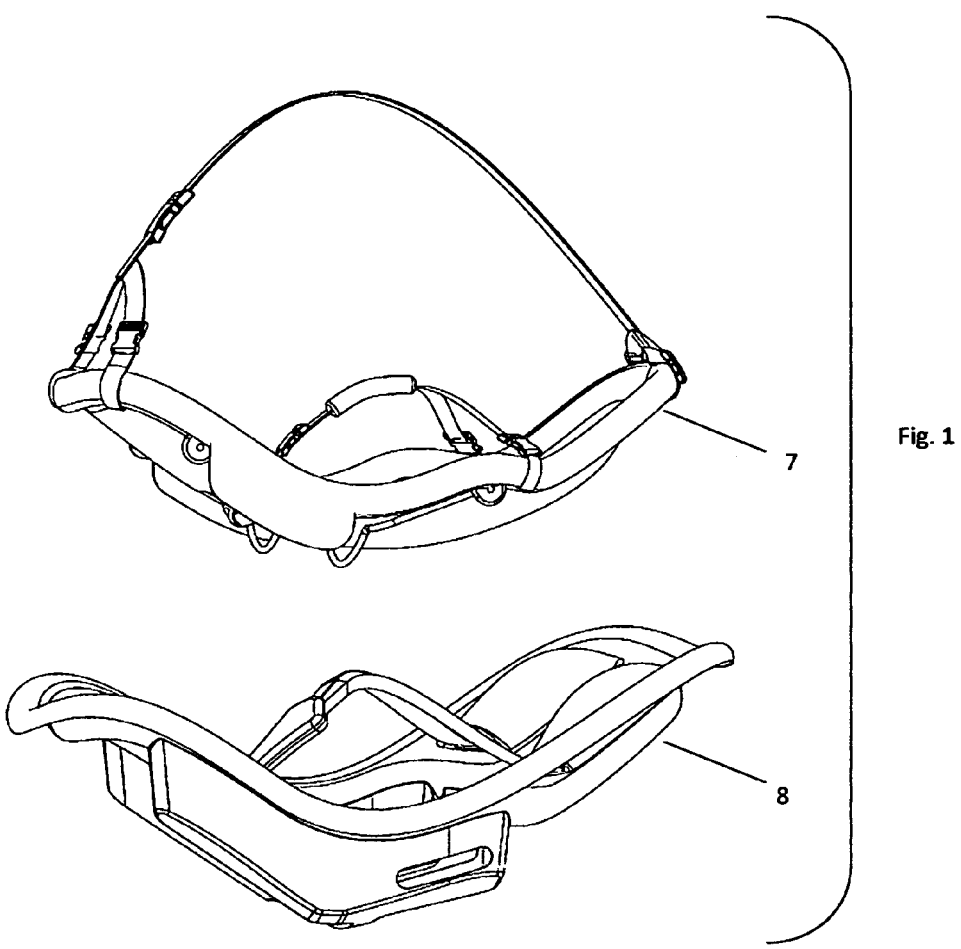
FIG. 1 is an illustration of the carrier portion and the corresponding car seat portion of an embodiment of the invention.

| DRAWING—Reference Numerals | |
|---|---|
| 7 | carrier portion |
| 8 | car seat portion |
| 9 | pivot |
| 10 | carrier frame |
| 11 | carrier seat |
| 12 | hip rest |
| 13 | pivot |
| 14 | rear kickstand |
| 15 | connector strap foot |
| 16 | front kickstand |
| 17 | shoulder strap |
| 18 | connector strap head |
| 19 | female quick connect |
| 20 | shoulder strap piece |
| 21 | male quick connect |
| 22 | leg strap |
| 23 | crossbar |
| 24 | carrier restraint strap |
| 25 | handle |
| 26 | inset trough |
| 27 | car seat shell |
| 28 | car seat left restraint strap |
| 29 | car seat buckle |
| 30 | carrier pass through hole |
| 31 | car seat right restraint strap |
| 32 | slots for vehicle seat belts |
| 33 | latch |
| 34 | wearer |
| 35 | child |
| 36 | car seat backrest |
| 37 | seat rest |

DETAILED DESCRIPTION

Figure 2:
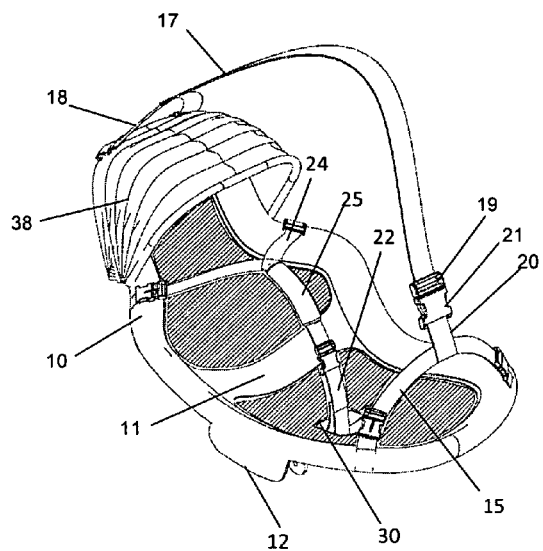
FIG. 2 is an illustration of the carrier portion of an embodiment of the invention shown from a top perspective.
Figure 3:
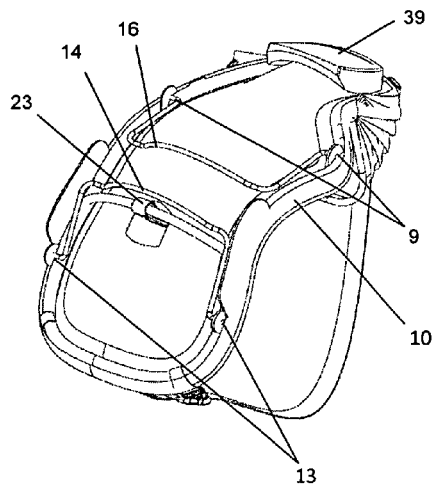
FIG. 3 is an illustration of the carrier portion of an embodiment of the invention shown from a bottom perspective.

An embodiment of the present invention is illustrated in FIG. 1 which shows the carrier portion 7 and the car seat portion 8. FIG. 2 shows the carrier portion frame 10 that is a rigid, contoured, member comprising the perimeter structure for the carrier. The carrier frame 10 provides a manner that allows for an enveloping fabric seat 11 to be attached at intervals around the perimeter of the carrier frame. A pass-through hole 30 is provided for leg strap 22. The frame contains a hip rest portion 12 that is smoothly contoured and extends downward providing an extended surface area. Referring to FIG. 3, the carrier frame 10 has a provision for pivots 9 and 13 and positioning detents for kick stands 14 and 16. The kick stands are configured to flex against detent geometry that hold the kick stands in open and closed positions in pivot areas 9 and 13 in the carrier frame. As shown in FIG. 2, a strap 17 is attached to two length adjustable straps 18 at the head of the frame as shown. Another end of strap 17 is passed through a loop in part 19 and permanently secured. Part 19 is one half of a quick connect fastener. Strap 20 is connected to two length adjustable straps 15 at the foot of the frame as shown. The free end of the strap 20 is passed through a loop in the male part of the quick connector 21 and permanently attached. Engaging the two quick connect parts 19 and 21 forms a closed loop, adjustable shoulder strap. Strap 22 is attached to the frame crossbar 23 in the position shown in FIG. 3. The free end of strap 22 is attached to a quick connect fastener part. An additional strap assembly 24 containing handle 25 is attached to the carrier frame as shown.

Figure 4:
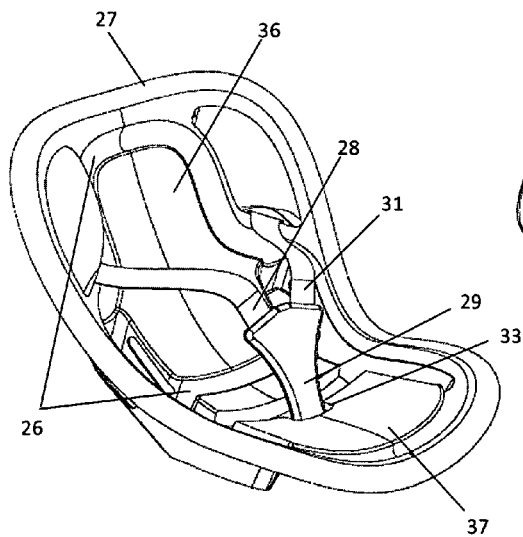
FIG. 4 is an illustration of the car seat portion of an embodiment of the invention shown from a top perspective.
Figure 5:
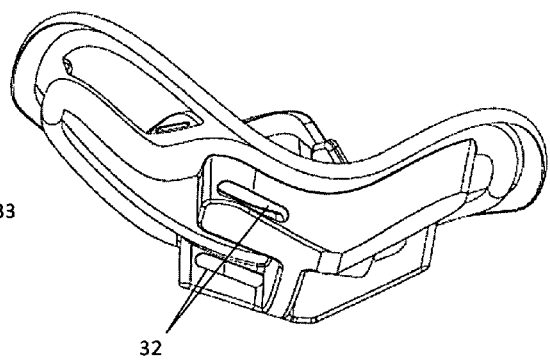
FIG. 5 is an illustration of the car seat portion of an embodiment of the invention shown from a bottom perspective.

FIG. 4 shows the car seat portion 8 which consists of a rigid shell 27 contoured with a back rest 36 and seat 37 to accept a reclined child. A clearance trough 26 is inset into the shell along a perimeter and latitudinally in two locations matching the perimeter of the carrier frame 10, so that when the carrier portion is present all frame and kick stand portions of the mating carrier portion reside lower than the seat and backrest portion of the shell. Shoulder harness strap 28 and 31 are shown. Buckle 29 mates with a buckle latch 33 in area shown. FIG. 5 illustrates slots 32 which provide a means for securing the car seat portion within the vehicle.

Figure 6:
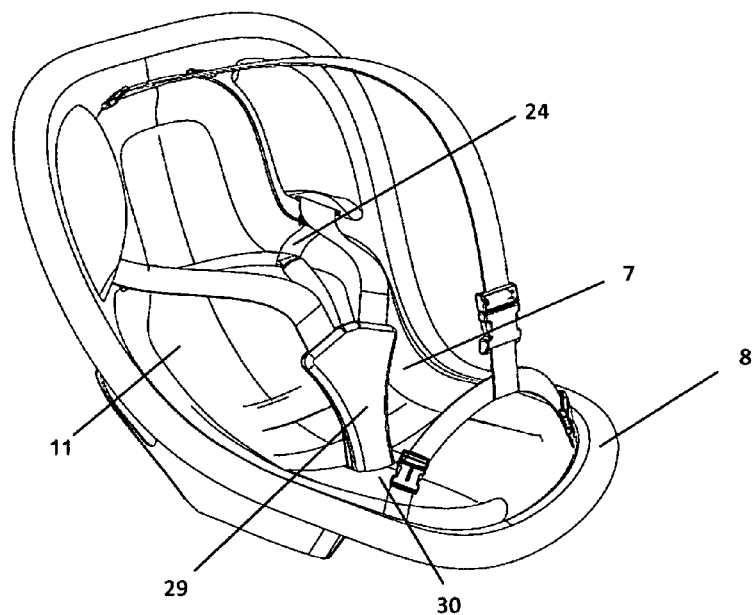
FIG. 6 is an illustration of an embodiment of the invention showing the carrier portion assembled into the car seat portion.

The carrier portion 7 is shown with the carrier frame 10 nested in the trough 26 of the corresponding car safety seat portion (car seat) 8 in FIG. 6. The fabric seat 11 of the carrier portion rests on the contoured shell 27 of the car seat portion. The straps 28 and 31 and buckle 29 are positioned outboard of the carrier restraint straps and handle. The carrier portion pass through hole 30 provides clearance for car seat portion buckle 29 and allows it to mate with the latch 33 in the car seat.

Figure 7:
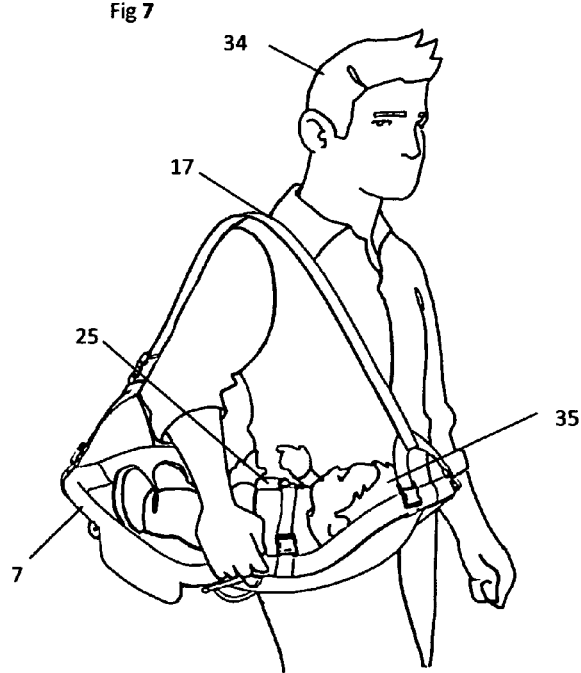
FIG. 7 is an illustration of a child in a possible embodiment of the carrier portion of the invention and the carrier positioned on the shoulder of the wearer.
Figure 8:
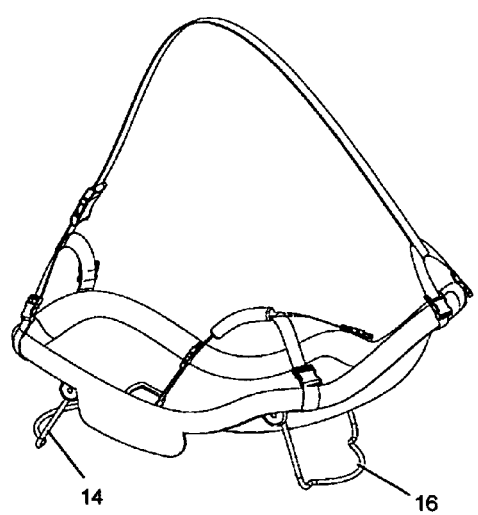
FIG. 8 is an illustration of an embodiment of the carrier portion of the invention with the support kickstands deployed.

A wearer 34 is shown with a child 35 seated in the carrier 7 in FIG. 7. Strap 17 is resting on the wearer's right shoulder and frame portion 12 is resting on the wearer's right hip. The wearer's right hand is provided comfortable access to the handle 25 of the carrier. All portions of the carrier 7 are away from the wearer's chest and torso. FIG. 8 also shows the carrier 7 with kickstands 14 and 16 in the extended position for setting the carrier down on a surface.

The construction of carrier frame 10 may be a single bent rod wrapped with a foam extrusion. The attachment points for the seat may be loops of fabric sewn after wrapping over the top of the frame. In another embodiment, the seat portion may be constructed from a thermoformed sheet product rather than fabric or be a combination of fabric laminated to a foam or plastic material. The pass-through area 30 of the carrier may be configured to allow for the shape requirements of many car seat restraint straps. In another embodiment, the strap 17 and non-slip shoulder pad may be combined into one part by using a laminated composite of foam and strapping material. The carrier frame may be produced in an ultra-light material such as carbon fiber. The carrier frame 10 and seat 11 may be molded as one piece using injection molding. An expandable pocket 39 for storage may be added. A sun hood or sun shade 38 could be added. The kickstands 14 and 16 may be configured to extend and contract automatically. The restraint systems for both the carrier and car seat could also comprise additional belts, making them five point harness systems. The carrier could have a portion of the seat 11 made from a mesh that allows air to pass through.

Operation of the Invention

Proper use of the carrier portion 7 is to load the child 35 onto the seat 11, putting the restraining strap 24 over the child's head to rest on his shoulders and lifting strap 22 between the child's legs. Connecting the quick connector parts on straps 24 and 22 creates a three point harness. Adjust the required tightness using the strap length adjustment on the quick connects. Handle 25 may be used to lift the carrier. Shoulder strap 17 may be suspended on either the wearer's closest shoulder or passed over the wearer's head to his farthest shoulder. The length is adjusted on straps 15 and 18. The wearer puts his hand or forearm on the frame 10 and the hip rest portion 12 rests against the wearer's hip. The kick stands 14 and 16 are retracted by pulling towards the center causing them to be passed over a detent portion for storage. After transporting the carrier, the kick stands are moved to the extended position as shown in FIG. 8. The wearer lifts on the handle 25 and takes the carrier from his shoulder. The carrier can then be set on a level surface without unduly disturbing the infant. Unloading the infant from the carrier is accomplished by disconnecting the quick connects on restraint strap 24 and passing it over the child's shoulders. The infant can then be lifted straight out of the carrier with a minimum of disturbance. The carrier portion 7 and the car seat portion 8 each may be used independently from the other and in conjunction with the other.

To use the car seat portion 8 independently, buckle 29 is unlatched and lifted along with strap 28 and 31 to lie over the top of the car seat. Once the child is placed in the seat portion of the shell, the shoulder straps 28 and 31 are passed over the child's head and the buckle 29 is secured to its mating latch 33 on the shell. The car seat portion is positioned rearward facing on the vehicle seat and is secured to the vehicle by passing the vehicle's seat belt through the two slots 32 on the shell and fastening the seat belt.

The carrier portion 7 may be used in conjunction with the car seat portion by unbuckling the car seat portion 8 buckle 29 and positioning the shoulder straps 28 and buckle 31 over the top of the shell. The carrier 7 with the child is lifted into the car seat portion 8. The frame of the carrier portion 10 locates in the trough portion 26 of the car seat. The retracted kick stands 14 and 16 also rest in the trough 26 of the car seat. The fabric portion 11 of the carrier mates against the back rest 36 and seat 37 areas of the car seat shell. The safety straps 28 and 31 are lowered over the child's head and the buckle 29 is secured to the mating latch 33 in the same operation as if the carrier portion 7 were not present.

Advantages

From the description above, a number of advantages of my child carrier and car seat combination become evident:
 (a) The car seat and carrier portion operate together but also operate independently and may be sold independently.
 (b) The carrier portion employs a means for carrying that is more ergonomic and convenient than current devices.
 (c) The carrier handle and shoulder strap embodiment allows the wearer to easily maneuver and set the carrier down without jostling a sleeping child.
 (d) The ultra-light nature of the carrier portion makes it compatible for extended use over a variety of terrain and provides improved access between the wearer and the child.
 (e) The ultra-light nature of the carrier broadens the community of wearers to include less robust and elderly users.
 (f) The intuitive operation of both the carrier portion and car seat portion makes the system readily accessible to first time users.
 (g) The efficiency of the embodiment will allow for economic manufacturing and distribution.

Conclusions, Ramifications, and Scope

Accordingly, the reader will see that the means for both independent and combined function exist between the car seat and carrier portions. The independent function of the car seat portion allows it to operate in the same manner whether or not the carrier portion is present. This allows the carrier portion to be configured to be as ultra-light as possible without needing the durable components and couplings required for transferring the vehicles safety restraint requirements through the car seat portion to the carrier restraints.

Accordingly, the reader will see that the resulting contoured, padded, lightweight carrier is worn comfortably and securely on the shoulder of the wearer and that the carrier's unique restraint and handle combination provide well balanced maneuverability of the carrier portion.

The position of the child is a natural, cradled one with proper visibility and access between the wearer and the infant.

The wearer can intuitively mount and un-mount the carrier by himself with the child loaded without disturbing the infant, which is significantly important when the child may be fussy.

The carrier portion permits extended use carrying that requires a minimum of effort. It permits an immediate change between wearers allowing two wearers to easily share responsibilities during an outing. The materials and processes used to manufacture the carrier portion are intended to minimize weight and no requirement from the car seat safety system that could negatively influence the weight is present in the embodiment of the carrier.

Although the description above contains many specificities, these should not be construed as limiting to the scope of the invention, but merely providing illustrations of some of the presently preferred embodiments of this invention. Thus the scope of the invention should be determined by the appended claims and their legal equivalents rather than by the examples given.

What is claimed is:

1. A child carrier and car seat combination, wherein in a first mode the child carrier and car seat operate together and in a second mode the child carrier and car seat operate separately, the combination comprising:
 a child carrier having a rigid, contoured frame perimeter structure, wherein the child carrier comprises:
 a head and foot section;
 a pass through hole in the foot section;
 a crossbar frame attached underneath and across a rear of the child carrier;
 a fabric seat and back rest attached at intervals around the rigid, contoured frame perimeter structure of the child carrier, wherein the fabric seat includes a pass through hole that lies over the pass through hole in the foot section of the child carrier;
 a first restraint system comprising an adjustable left and right shoulder strap and an adjustable leg strap, wherein the adjustable left and right shoulder straps and adjustable leg strap connect to form a handle strap for carrying the child carrier when the child carrier and car seat are operated separately;
 a shoulder strap connecting the head and foot sections of the child carrier, for carrying the child carrier by a wearer when the child carrier and car seat are operated separately; and
 a child car seat having a rigid shell contoured with a seat and back and a clearance trough inset into the perimeter of the rigid shell that matches the rigid, contoured frame perimeter structure of the child carrier, in which the child carrier sits when the child carrier and car seat are operated together, wherein the child car seat comprises:
 a second restraint system comprising an adjustable left and right shoulder strap, wherein the adjustable left and right shoulder straps connect from the back of the rigid shell of the car seat to a buckle, wherein the buckle connects through the pass through holes of the fabric seat and the foot section of the child carrier to a buckle latch in the seat of the rigid shell of the car seat; and
 slots located on the upper rear portion of the rigid shell of the car seat that secures the child carrier and car seat combination within a vehicle by passing the vehicle's seat belt through the slots and connecting to the vehicle's seat belt latch.

2. The child carrier and car seat combination of claim 1, wherein the child carrier further comprises a plurality of foldable kickstands for supporting the child carrier when the child carrier and car seat are operated separately.

3. The child carrier and car seat combination of claim 1, wherein the crossbar frame is located underneath and proximal to the pass through hole in the foot section of the child carrier.

4. The child carrier and car seat combination of claim 1, wherein the adjustable left and right shoulder straps in the first restraint system are attached to the child carrier, and wherein the leg strap is attached to the crossbar frame of the child carrier through the pass through holes of the fabric seat and the foot section of the child carrier.

5. The child carrier and car seat combination of claim 1, wherein the adjustable left and right shoulder straps of the first restraint system includes a distal adjustable connector, and the leg strap of the first restraint system includes a proximal adjustable connector.

6. The child carrier and car seat combination of claim 1, wherein the shoulder strap connecting the head and foot sections of the child carrier further comprises two adjustable straps attached at the head of the frame of the child carrier, and two adjustable straps attached at the foot of the frame of the child carrier, wherein the shoulder strap connects to the two adjustable straps attached at the head of the frame of the child carrier, and wherein the shoulder strap connects to the two adjustable straps attached at the foot of the child carrier.

7. The child carrier and car seat combination of claim 1, wherein the child carrier further comprises an extended hip rest portion.

8. The child carrier and car seat combination of claim 7, wherein the child carrier provides balance while using only two contact points on the wearer, one contact point being at the shoulder strap and the second contact point being at the hip rest portion of the child carrier.

9. The child carrier and car seat combination of claim 8, wherein the weight of the child carrier is supported by the wearer's shoulder with the extended hip rest portion contacting the wearer's hip.

10. The child carrier and car seat combination of claim 1, wherein the child carrier frame nests in the clearance trough inset of the rigid shell.

11. The child carrier and car seat combination of claim 1, wherein the fabric seat and back rest comprises mesh to allow air to flow through.

12. The child carrier and car seat combination of claim 1, further comprising a removable sun shade or an expandable pocket.

13. A child carrier comprising:
  a child carrier having a rigid, contoured frame perimeter structure, wherein the child carrier comprises:
    a head and foot section;
    a pass through hole in the foot section;
    a crossbar frame attached underneath and across a rear of the child carrier;
    a fabric seat and back rest attached at intervals around the rigid, contoured frame perimeter structure of the child carrier, wherein the fabric seat includes a pass through hole that lies over the pass through hole in the foot section of the child carrier;
    a restraint system comprising an adjustable left and right shoulder strap and an adjustable leg strap, wherein the adjustable left and right shoulder straps and adjustable leg strap connect to form a handle strap for carrying the child carrier when the child carrier and car seat are operated separately; and
    a shoulder strap connecting the head and foot sections of the child carrier, for carrying the child carrier by a wearer.

14. The child carrier of claim 13, wherein the child carrier further comprises a plurality of foldable kickstands for supporting the child carrier.

15. The child carrier of claim 13, wherein the crossbar frame is located underneath and proximal to the pass through hole in the foot section of the child carrier.

16. The child carrier of claim 13, wherein the adjustable left and right shoulder straps in the restraint system are attached to the child carrier, and wherein the leg strap is attached to the crossbar frame of the child carrier through the pass through holes of the fabric seat and the foot section of the child carrier.

17. The child carrier of claim 13, wherein the adjustable left and right shoulder straps of the restraint system includes a distal adjustable connector, and the leg strap of the restraint system includes a proximal adjustable connector.

18. The child carrier of claim 13, wherein the shoulder strap connecting the head and foot sections of the child carrier further comprises two adjustable straps attached at the head of the frame of the child carrier, and two adjustable straps attached at the foot of the frame of the child carrier, wherein the shoulder strap connects to the two adjustable straps attached at the head of the frame of the child carrier, and wherein the shoulder strap connects to the two adjustable straps attached at the foot of the child carrier.

19. The child carrier of claim 13, wherein the child carrier further comprises an extended hip rest portion, wherein the child carrier provides balance while using only two contact points on the wearer, one contact point being at the shoulder strap and the second contact point being at the hip rest portion of the child carrier.

20. The child carrier of claim 13, wherein the fabric seat and back rest comprises mesh to allow air to flow through.

* * * * *